May 6, 1952 K. M. McLAUGHLIN 2,595,475

ELECTRODE SUPPORT FOR SEMICONDUCTOR DEVICES

Filed Dec. 23, 1949

Inventor

KENNETH M. McLAUGHLIN

By H. Webster

Attorney

Patented May 6, 1952 2,595,475

UNITED STATES PATENT OFFICE 2,595,475

ELECTRODE SUPPORT FOR SEMI-CONDUCTOR DEVICES

Kenneth M. McLaughlin, Summit, N. J., assignor to Radio Corporation of America, a corporation of Delaware Application December 23, 1949, Serial No. 134,802

18 Claims. (Cl. 175—366)

This invention relates generally to semi-conductor devices, and particularly relates to the construction of the electrodes and the electrode support of a semi-conductor amplifier or oscillator.

A semi-conductor device adapted to provide an amplifier or oscillator comprises a semi-conducting crystal such as a germanium crystal having a base electrode, an emitter electrode and a collector electrode. The base electrode usually has a large-area contact with the crystal while the emitter and collector electrodes have small-area contacts with the crystal. It is well known that the power gain, the high frequency performance and other electrical characteristics of such a semi-conductor device which has been termed a transistor, depend critically on the distance between the two point electrodes, that is, the emitter and collector electrodes and on their contact pressures with the crystal. Accordingly, the distances between the point electrodes and their contact pressures with the crystal must be maintained during the useful life of the device at their predetermined values. Any change in the distance of the electrodes and the alignment of the device is detrimental to its operation.

In order to provide adjustment between the crystal and its point electrodes the two point electrodes may be mounted on a plastic shell or insulating cylinder through which a metallic stud extends which bears the crystal. The metallic stud thus provides the base electrode of the device. The required contact pressure is obtained by forcing the metallic stud through the insulating cylinder which supports the point electrodes. A semi-conductor device of this type has been disclosed and claimed in the copending application to G. M. Rose, Serial No. 90,702, filed on April 13, 1949 now Patent 2,538,593 of January 16, 1951 and assigned to the assignee of this application. It is believed that the plastic cylinder which supports the point electrodes may change its shape due to cold flow. Furthermore, the metallic stud which bears the crystal is provided with a stiff wire forming a pin for insertion in a sub-miniature tube socket. Every time the pins of the device are pushed into a tube socket the resulting strain on the pins may cause a shift of the position of the crystal with respect to its point electrodes which is detrimental to the operation of the device.

The construction of the transistor disclosed in the Rose patent above referred to is not well adapted for large scale production. This is due to the difficulty of assembling the various parts constituting the finished device and of adjusting the electrodes with respect to the crystal. Furthermore, the metallic stud which supports the crystal must have a press fit with the outer cylinder which requires rather close tolerances difficult to maintain during large scale production.

It is accordingly an object of the present invention to provide a semi-conductor device having an improved construction of the electrodes and the electrode support whereby permanent alignment of the crystal with respect to its electrodes may be secured.

Another object of the invention is to provide a multielectrode semi-conductor device adapted for use as an amplifier or oscillator and having a simplified construction which does not require close tolerances or matching parts and suitable for large scale production.

A further object of the invention is to provide an improved transistor construction whereby the position of the crystal with respect to its point electrodes is adjustable to provide the desired contact pressure before the parts are rigidly fastened together and whereby the danger of cold flow of the electrode support is avoided.

A semi-conductor device in accordance with the present invention comprises a semi-conducting crystal and three or more electrodes in contact with the crystal. The three electrodes are supported by a single block of insulating material, which preferably consists of glass. Thus, the occurrence of cold flow is effectively prevented. The electrodes are secured to three or four conductors which extend through the insulating support. One of the electrodes is the base electrode to which the crystal is secured, for example, by soldering.

In accordance with a preferred embodiment of the invention each of the electrodes of the semi-conductor device is welded to a single conductor such as a stiff wire. The base electrode consists of a piece of sheet metal having a vertical leg portion and a horizontal shelf portion which may be provided by folding the sheet back upon itself. The crystal is soldered to the shelf portion while the leg portion is provided with a straight groove to which a support wire may be welded. This permits adjustment of the relative position of the crystal with respect to its point electrodes before the base electrode is welded or otherwise secured to its supporting wire.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is an elevational view, partly in section, with certain portions broken away, of a semi-conductor device constructed in accordance with the present invention and having point electrodes in the form of coil springs;

Figure 2 is a cross sectional view of the device of Figure 1 taken on line 2—2 of Figure 1;

Figure 3 is an elevational view, partly in section, with certain parts broken away, of a modified semi-conductor device embodying the present invention and having point electrodes as disclosed and claimed in the copending application to Rose above referred to;

Figure 4 is a cross sectional view of the device of Figure 3 taken on line 4—4 of Figure 3;

Figure 5 is a cross sectional view of a modification of the invention from the forms shown in Figures 3 and 4, which permits adjustment of the relative position of the crystal and its point electrodes before the parts are secured together;

Figures 1, 2, 3, 4, 5, 6, 7, 8, 9:
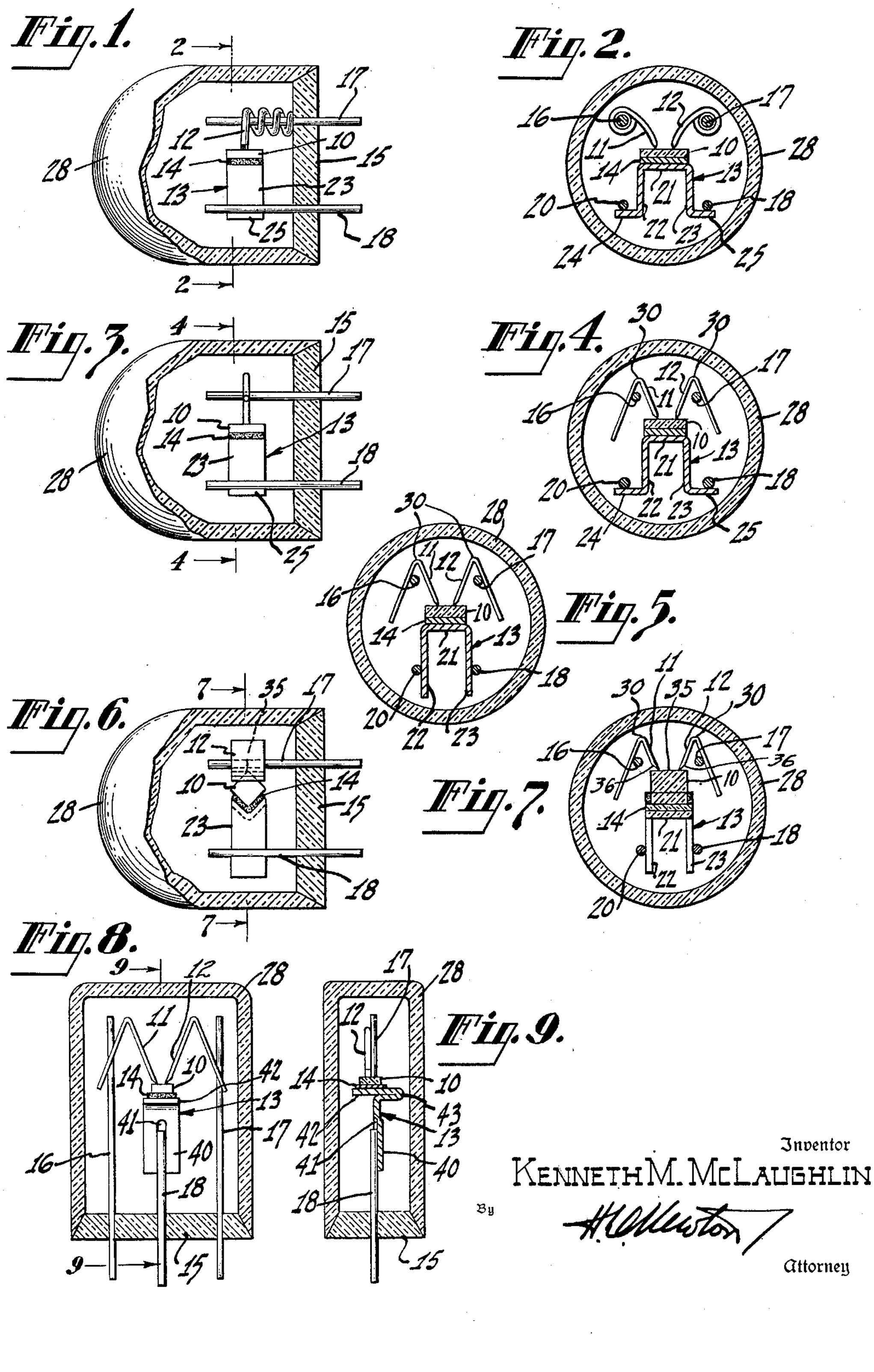

Figure 6 is an elevational view, partly in section, with certain parts broken away, of a further modification of the invention, being a semi-conductor device having point electrodes constructed as disclosed and claimed in the copending application to J. P. Stelmak, Serial No. 96,356, filed on May 31, 1949 and assigned to the assignee of this application;

Figure 7 is a cross sectional view of the device of Figure 6 taken on line 7—7 of Figure 6;

Figure 8 is an elevational view, partly in cross-section, of a preferred modification of the semi-conductor device embodying the invention, which permits mounting of the base electrode and the crystal on a single supporting wire; and Figure 9 is a cross sectional view of the device of Figure 8 taken on line 9—9 of Figure 8.

Referring now to the drawing in which like components have been designated by the same reference numerals throughout the figures, and particularly to Figures 1 and 2, there is illustrated a semi-conductor device embodying the present invention which may be used as an amplifier, oscillator or the like. The device comprises a block or body 10 of semi-conducting material consisting, for example, essentially of a chemical element having semi-conducting properties such as germanium, silicon, boron, tellurium, or selenium containing a small but sufficient number of atomic impurity centers or lattice imperfections as commonly employed for best results in crystal rectifiers. Germanium is the preferred material for block 10 and may be prepared so as to be an electronic N type semi-conductor crystal as is well known. The top surface of semi-conducting block 10 may be polished and etched as is conventional. It is also feasible to utilize the germanium block from a commercial high-back-voltage germanium rectifier such as the type 1N34.

The semi-conductor device of the invention comprises two point electrodes generally indicated at 11 and 12 and a base electrode 13. The point electrodes 11 and 12 may be used as emitter and collector electrodes respectively and have a rectifying, high-resistance contact with body 10. Base electrode 13 is normally a large-area electrode which has a low-resistance, non-rectifying contact with body 10. To this end base electrode 13 may be soldered or sweated to body 10 as indicated at 14. The construction of electrodes 11 to 13 will be described more in detail hereinafter.

In accordance with the present invention a single unitary support 15 is provided for the electrodes of body 10. Electrode support 15 consists of an insulating material which is mechanically rigid and not subject to cold flow. Preferably, electrode support 15 consists of a flat plate of glass which may have a tapered edge as clearly shown in Figure 1. A plurality of stiff conductors 16, 17, 18 and 20 extend through electrode support 15 in spaced relation. Conductors 16, 17, 18 and 20 may, for example, consist of a stiff wire which may have a diameter of the order of 20 mils and which may be made, for example, of copper or any other metal to which the glass will bond. In accordance with the present invention, the electrodes 11 to 13 of body 10 are secured to wires 16, 17, 18 and 20.

As clearly shown in Figures 1 and 2, electrodes 11 and 12 consist each of a coil spring having one end secured to its respective support wire 16 and 17, for example, by welding. The free ends of coil springs 11 and 12 bear upon the upper surface of body 10 and are provided with a fine point or tip as clearly shown in Figure 2. Coil springs 11 and 12 are arranged to act as torsion springs and may consist of wires having a diameter of the order of 2 to 5 mils. The construction of the point electrodes 11 and 12 as shown in Figures 1 and 2 permits the application of a small contact pressure between the electrodes and body 10 by providing a long spring. The distance between the contact points of electrodes 11 and 12 may be of the order of two mils or less.

Base electrode 13 consists of a substantially channel-shape piece of sheet metal having a middle portion 21, two leg portions 22, 23 which extend at right angles to the middle portion 21 and two outwardly extending end portions 24, 25. The outwardly extending portions 24, 25 are welded to support wires 18 and 20. This will support base electrode 13 as well as body 10 which is fixed to the base electrode. Electrode support 15 accordingly provides a single or unitary support for the three electrodes, 11, 12 and 13 so that the spacing of the electrodes and their position with respect to body 10 will not change after they have once been assembled.

The semi-conductor device of the invention may be protected by a housing 28 which preferably fits over electrode support 15. Housing 28 may also be made of glass or plastic material or it may consist of a suitable metal such as cold-rolled steel.

Figures 3 and 4 illustrate a modified semi-conductor device in accordance with the invention. The only difference between the devices of Figures 1 and 2 and of Figures 3 and 4 is that the device of Figures 3 and 4 is provided with point electrodes 11 and 12 which consist of a piece of wire having a bend 30 intermediate its ends. This particular construction of the point electrodes has been disclosed and claimed in the copending Rose application above referred to. Each point electrode 11 and 12 is again welded to its respective wire support 16 and 17.

As illustrated in Figure 5 it is also feasible to provide a base electrode 13 which is of substantially U-shape. Thus, the base electrode consists of a middle portion 21 and two leg portions 22, 23. The two leg portions 22, 23 are welded to their support wires 18 and 20. Point electrodes 11 and 12 may have the construction of Figures 3 and 4.

The device of Figure 5 permits an adjustment of crystal 10 with respect to its point electrodes 11 and 12. The device of Figure 5 may be assembled as follows. First, body 10 is soldered to base electrode 13 while point electrodes 11 and 12 are soldered or welded to their support wires 16 and 17 with a predetermined spacing between their tips. Now, body 10 and base electrode 13 are moved against point electrodes 11 and 12 until the desired contact pressure has been obtained. The construction of point electrodes 11, 12 is such that the spacing between their tips does not change when body 10 is moved against the electrodes. Now, leg portions 22 and 23 are welded to their wire supports 18 and 20 to provide for a permanent alignment of the device. Body 10 and its electrodes 10 to 13 may then be protected by housing 28.

Figures 6 and 7 illustrate still another modification of the semi-conductor device of the invention. In this case, the point electrodes 11 and 12 are constructed in accordance with the Stelmak application above referred to. Semi-conducting body 10 is of wedge shape and may be in the form of a cube as illustrated having an upper edge or apex 35. The point electrodes 11 and 12 consist of thin sheets of metal as clearly shown in Figures 6 and 7. One of the end portions of each sheet is welded to wire supports 16 and 17. The other edge of each sheet which extends across edge 35 of crystal 10 may have a chisel point as clearly shown at 36 in Figure 7. Since metal sheets 11 and 12 extend substantially at right angles across the edge 35 of body 10 the electrodes again have point contacts with body 10. Base electrode 13 is again adjustable before being welded to its support wires 18, 20 as explained in connection with Figure 5.

Referring now to Figures 8 and 9 there is illustrated a preferred embodiment of the invention. Point electrodes 11 and 12 consist of wires as illustrated in Figures 3 to 5 which are welded to support wires 16 and 17. However, base electrode 13 is constructed in such a way that it requires but a single support wire 18. Base electrode 13 has a lower leg portion 40 provided with a substantially straight groove 41 adapted to receive support wire 18. The upper portion 42 of base electrode 13 is folded back upon itself to provide a horizontal support for body 10. This construction also permits to center body 10 above leg portion 40.

The device of Figures 8 and 9 preferably is assembled as follows. First, support wires 16 to 18 are clipped to a predetermined length so that wire 18 is shorter then the other wires 16 and 17. Then electrodes 11 and 12 are welded to wires 16 and 17 with their tips at a predetermined small distance. Furthermore, body 10 is soldered to the shelf portion 42 of base electrode 13. The semi-conductor device now consists of two sub-assemblies which may be secured together with the aid of a jig. The jig receives the bend 43 of base electrode 13 and an edge of electrode support 15. These two portions are moved against each other until point electrodes 11, 12 first touch body 10. Then, point electrodes 11 and 12 are further advanced against base electrode 13 and body 10 to provide the desired contact pressure. Wire support 18 is now spot-welded or soldered to groove 41 and the semi-conductor device is permanently secured together. Housing 28 may have a rectangular cross-section as indicated in Figure 9 or it may be round.

The construction of Figures 8 and 9 has the advantage that only three support wires 16, 17 and 18 are required. Furthermore, the relative position between body 10 and point electrodes 11 and 12 may be accurately adjusted on a jig so that every device may have the same contact pressure between the point electrodes 11, 12 and body 10.

There has thus been disclosed an improved semi-conductor device which may provide an amplifier, oscillator or the like. The device is of simplified construction and the position of the electrodes with respect to the semi-conducting body is permanently aligned because all electrodes are supported from a single support plate. Furthermore, the electrodes as well as a semi-conducting body are permanently welded or secured to stiff support wires so that their position will not vary during the lifetime of the device. The electrode support is made of a material such as glass which is not subject to cold flow. The semi-conductor device of the invention may conveniently be assembled or adjusted by a jig to provide for a reproducible contact pressure between the point electrodes and the semi-conducting body.

What is claimed is:

1. A semi-conductor device having a semi-conducting body, two small area electrodes in contact with said body, a channel-shape conducting member having a middle portion, said middle portion being fastened to said body to provide a large-area electrode, a unitary support for said electrodes including a single rigid block of insulating material, and at least three conductors extending through said block in spaced apart relation, each conductor being mechanically secured to and electrically connected to one of said electrodes.

2. A semi-conductor device having a semi-conducting body, two small-area electrodes in contact with said body, a substantially T-shape conducting member having a substantially flat top portion, said top portion being fastened to said body to provide a large-area electrode, a unitary support for said electrodes including a single block of insulating material, and at least three conductors extending through said block in spaced apart relation, each conductor being mechanically secured to and electrically connected to one of said electrodes.

3. A semi-conductor device comprising a semi-conducting body, two small-area electrodes in contact with said body, a metallic channel-shape element having a middle portion and two leg portions angularly disposed with respect to said middle portion, said middle portion forming a large-area electrode in contact with and fixed to said body, a single support member of insulating material, and four rod-shape stiff conductors extending through said member in spaced apart relation, said two small-area electrodes being individually secured to two of said conductors, and each of said leg portions of said element being secured to one of the remaining conductors.

4. A semi-conductor device comprising a semi-conducting body, two small-area electrodes in contact with said body, a metallic channel-shape element of substantially U-shape cross section having a middle portion and two leg portions extending substantially at right angles to said middle portion, said middle portion forming a large-area electrode in contact with and fixed to said body, a unitary support member of rigid insulating material, four rod-shape stiff wires extending through said member in spaced apart relation, said two small-area electrodes being individually welded to two of said wires, each of said leg portions being welded to one of the remaining wires, and a housing disposed about said support member and enclosing said body and said electrodes.

5. A semi-conductor device comprising a semiconducting body, two small-area electrodes in contact with said body, a metallic channel-shape element of substantially U-shape cross section having a middle portion and two leg portions, said middle portion forming a large area electrode in contact with and soldered to said body, a unitary support member of glass, four rod-shape stiff wires extending through said member in spaced apart relation, said two small-area electrodes being individually welded to two of said wires, each of said leg portions being welded to one of the remaining wires whereby the relative position of said body and element with respect to said small-area electrodes may be adjusted before said leg portions are welded to said one of the remaining wires, and a housing disposed about said support member and enclosing said body and said electrodes.

6. A semi-conductor device comprising a semiconducting body, two small-area electrodes in contact with said body, a metallic channel-shape element having a middle portion forming a large-area electrode in contact with and fixed to said body, said element having outwardly extending end portions, a single support member of rigid insulating material, and four rod-shape stiff conductors extending through said member in spaced apart relation, said two small-area electrodes being individually secured to two of said conductors, and each of the end portions of said element being secured to one of the remaining conductors.

7. A semi-conductor device comprising a semiconducting body, two small-area electrodes in contact with said body, a metallic channel-shape element having a middle portion forming a large-area electrode in contact with and fixed to said body, said element having outwardly extending end portions, a unitary support member of single insulating material, four rod-shape stiff wires extending through said member in spaced apart relation, said two small-area electrodes being individually welded to two of said wires, each of the end portions of said element being welded to one of the remaining wires and a housing disposed about said support member and enclosing said body and said electrodes.

8. A semi-conductor device comprising a semiconducting body, two small area electrodes in contact with said body, a unitary electrode member consisting of a metal sheet having a substantially T-shape cross section, said body being secured to said electrode member to provide a large-area contact with said body, a glass support, three stiff wires extending through said support in spaced apart relation, said small-area electrodes being secured individually to two of said wires, and the third wire being secured to said member.

9. A semi-conductor device comprising a semiconducting body having a top and a bottom surface, two point electrodes in contact with said top surface, a unitary electrode member consisting of a metal sheet having a substantially T-shape cross section, a first portion of said electrode member constituting a leg and a second portion extending in a plane substantially at right angles to the plane of said leg, the bottom surface of said body being secured to said second portion to provide a large-area contact with said body, a glass support, three stiff wires extending through said support in spaced apart relation, said point electrodes being welded individually to two of said wires, the third wire being welded to said leg, and a housing disposed about said support and enclosing said body and said electrodes.

10. A semi-conductor device comprising a semiconducting body having a top and a bottom surface, two point electrodes in contact with said top surface, a unitary electrode member consisting of a metal sheet having a substantially T-shape cross section, a first portion of said electrode member constituting a leg and a second portion being folded back upon itself and extending in a plane substantially at right angles to the plane of said leg, the bottom surface of said body being soldered to said second portion to provide a large-area contact with said body, said leg being provided with a substantially straight groove, a glass support, three stiff wires extending through said support in spaced apart relation, said point electrodes being secured individually to two of said wires, and the third wire being secured to the groove in said leg whereby the relative position between said body and said point electrodes may be adjusted before said third wire is welded to said leg.

11. A semi-conductor device comprising a semiconducting body having a top and a bottom surface, two point electrodes in contact with said top surface, a unitary electrode member consisting of a metal sheet having a substantially T-shape cross section, a first portion of said electrode member constituting a leg and a second portion being folded back upon itself and extending in a plane substantially at right angles to the plane of said leg, the bottom surface of said body being soldered to said second portion, to provide a large-area contact with said body, said leg being provided with a substantially straight groove extending at right angles to said second portion, a glass support, three stiff wires extending through said support in spaced apart relation, said point electrodes being welded individually to two of said wires, the third wire being welded to the groove in said leg whereby the relative position between said body and said point electrodes may be adjusted before said third wire is welded to said leg, and a housing disposed about said support and enclosing said body and said electrodes.

12. A semi-conductor device comprising a semi-conducting body, a base electrode in contact with said body, a pair of rod-like conductors, and a spiral spring of conducting material encircling each of said conductors and having one end portion secured thereto, the other end portion of each of said springs being in contact with said body to provide small-area electrodes.

13. A semi-conductor device comprising a semi-conducting body, a base electrode in contact with said body, a pair of stiff wires and a spiral spring of fine wire encircling each of said wires and having one end portion secured thereto, the other end portion of each of said springs being in contact with said body to provide a pair of small-area electrodes.

14. A semi-conductor device comprising a semi-conducting body, at least three electrodes in contact with said body, a common support for said electrodes consisting of a single block of a rigid insulating material, at least three stiff wires extending through said block in spaced apart relation, two coil springs, each encircling one of said wires and having one of its end portions secured to its wire, the other end portions of said springs being in contact with said body to provide two of said electrodes, and a channel-shape conducting member having one portion connected to said body to provide another one of said electrodes, another portion of said member being secured to at least a further one of said wires.

15. A semi-conductor device comprising a semi-conducting body, at least three electrodes in contact with said body, a common support for said electrodes consisting of a single block of glass, at least three stiff wires extending through said block in spaced apart relation, two coil springs of a filamentary conductor, each encircling one of said wires and having one of its end portions secured to its wire, the other end portions of said springs being in contact with said body to provide two of said electrodes of relatively small contact area, and a channel shape conducting member having its middle portion soldered to said body to provide another one of said electrodes of relatively large contact area, at least one leg portion of said member being welded to another one of said wires.

16. A semi-conductor device including a semi-conducting body having two substantially parallel surfaces, a first electrode in low-resistance contact with one of the surfaces of said body, said first electrode consisting of a conducting member supporting said body and having at least one leg portion extending away from said body, at least two further electrodes in rectifying contact with the other surface of said body, a common support for said electrodes including a single block of insulating material, and at least three stiff conductors extending through said block in spaced apart relation, one of said conductors being mechanically secured and electrically connected to each of said rectifying electrodes, and at least a further one of said conductors being mechanically secured and electrically connected to the leg portion of said conducting member, said conductors providing the sole support of said electrodes and of said body.

17. A semi-conductor device including a semi-conducting body having two substantially parallel surfaces, a first electrode in low-resistance contact with one of the surfaces of said body, said first electrode consisting of a conducting member supporting said body and having at least one leg portion extending substantially at right angles from said body, at least two further electrodes in rectifying contact with the other surface of said body, a unitary support for said electrodes consisting of a single block of glass, and at least three stiff conductors extending through said block in spaced apart relation, one of said conductors being mechanically secured and electrically connected to each of said rectifying electrodes, and at least a further one of said conductors being mechanically secured and electrically connected to the leg portion of said conducting member, said conductors providing the sole support of said electrodes and of said body.

18. A semi-conductor device including a semi-conducting body having two substantially parallel surfaces, a first electrode in low-resistance contact with one of the surfaces of said body, said first electrode consisting of a metallic sheet supporting said body and having at least one leg portion extending substantially at right angles from said body, at least two further electrodes in rectifying contact with the other surface of said body, a common support for said electrodes including a single block of insulating material substantially immune to cold flow, and at least three stiff wires extending through said block in spaced apart relation, one of said wires being mechanically secured and electrically connected to each of said rectifying electrodes, and at least a further one of said wires being mechanically secured and electrically connected to the leg portion of said metallic sheet, said wires providing the sole support of said electrodes and of said body.

KENNETH M. McLAUGHLIN.

REFERENCES CITED

The following references are of record in the file of this patent:

UNITED STATES PATENTS

| Number | Name | Date |
|---|---|---|
| 2,391,506 | Pearson | Dec. 25, 1945 |
| 2,423,476 | Billings et al. | July 8, 1947 |
| 2,463,805 | Poyle et al. | Mar. 8, 1949 |
| 2,468,051 | Escoffery | Apr. 26, 1949 |
| 2,486,776 | Barney | Nov. 1, 1949 |